US006847624B2

(12) United States Patent
Ishii et al.

(10) Patent No.: US 6,847,624 B2
(45) Date of Patent: Jan. 25, 2005

(54) CDMA MOBILE COMMUNICATIONS SYSTEM AND ITS RANDOM ACCESS CONTROL METHOD AND BASE STATION

(75) Inventors: Minami Ishii, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 785 days.

(21) Appl. No.: 09/764,191

(22) Filed: Jan. 17, 2001

(65) Prior Publication Data

US 2001/0008524 A1 Jul. 19, 2001

(30) Foreign Application Priority Data

Jan. 18, 2000 (JP) ........................................ 2000-009465

(51) Int. Cl.[7] .............................................. H04B 7/216
(52) U.S. Cl. ...................................... 370/335; 370/342
(58) Field of Search ................................ 370/335, 328, 370/329, 331, 332, 333, 342, 229, 230, 231, 235, 236, 441; 375/130, 144, 145, 147, 148

(56) References Cited

U.S. PATENT DOCUMENTS

| 5,390,181 | A | * | 2/1995 | Campbell et al. ........... 370/444 |
| 5,430,760 | A | | 7/1995 | Dent ........................... 375/144 |
| 6,292,493 | B1 | * | 9/2001 | Campbell et al. ........... 370/445 |
| 6,408,009 | B1 | * | 6/2002 | Campbell et al. ........... 370/461 |
| 6,493,540 | B1 | * | 12/2002 | Suzuki ..................... 455/67.11 |

FOREIGN PATENT DOCUMENTS

| WO | WO 98/18280 | 4/1998 | ............ H04Q/7/38 |
| WO | WO 99/41845 | 8/1999 | ............ H04B/1/69 |

OTHER PUBLICATIONS

Minami Ishii et al., "Performance Evaluation of Path Timing Detection in CDMA Random Access", IEICE General Convention 2000, B–5–52, p. 437, Mar. 2000.

Motorola, Texas Instruments, "Proposal for RACH Preambles", 3GPP TSG–RAN Working Group 1 meeting #6, (99)893, Jul. 1999.

Hakan Olofsson et al., "Performance Evaluation of Different Random Access Power Ramping Proposals for the WCDMA System", IEEE PIMRC'99, pp. 1505–1509, Sep. 1999.

Georg Frank et al., "Random Access Scheme for the ETSI / UTRA WCDMA", IEEE VTC'99 Spring, pp. 1360–1364, May 1999.

* cited by examiner

*Primary Examiner*—Brian Nguyen
(74) *Attorney, Agent, or Firm*—Workman Nydegger

(57) ABSTRACT

A CDMA mobile communications system and its random access control method and base station are provided that can reduce the probability of failing to detect the preamble. A preamble detector measures the signal-to-interference power ratio of a received preamble after RAKE combining, and makes a decision on whether to authorize a mobile station to transmit a message or not by comparing the detection result with the threshold value. Receiving from the preamble detector the decision result indicating that the measurement value is equal to or greater than the threshold value, a CPU causes a transmitter to transmit a transmission control signal authorizing a mobile station sending the preamble to transmit the message. In contrast, when the decision result indicates that the measurement value is less than the threshold value, the CPU does not authorize the mobile station to transmit the message.

4 Claims, 2 Drawing Sheets

CDMA MOBILE COMMUNICATIONS SYSTEM AND ITS RANDOM ACCESS CONTROL METHOD AND BASE STATION

This application claims the benefit of Patent Application No. 2000-9465 filed Jan. 18, 2000 in Japan, the content of which is incorporated hereinto by reference.

BACKGROUND OF THE INVENTION

1. Field of the Invention

The present invention relates to a CDMA mobile communications system and its random access control method and base station. More particularly, it relates to a CDMA mobile communications system that allows a plurality of mobile stations to access a base station at any time using a common channel, and has the base station control the message transmission of the mobile stations, and its random access control method and base station.

2. Description of Related Art

In a random access control method of a conventional CDMA mobile communications system, a mobile station which tries to make a call transmits a preamble notifying a base station of occurrence of a message, and the base station that receives the preamble compares the output of a matched filter with a predetermine threshold value, and transmits a transmission control signal for controlling the message transmission of the mobile stations in response to the compared result. The output of a matched filter, however, has a plurality of peaks because of the signal power dispersion due to delay spread on a transmission path. As a result, the probability of missing the preamble increases when comparing the peak values with the threshold value.

In this way, the random access control method of the conventional CDMA mobile communication makes a decision on whether to authorize the message transmission or not by comparing the output of a matched filter with the threshold value. In other words, it makes a decision in the condition of the signal power dispersion, which offers a problem of increasing a chance of missing the preamble.

SUMMARY OF THE INVENTION

The present invention is implemented to solve the foregoing problem. It is therefore an object of the present invention to provide a CDMA mobile communications system and its random access control method and base station capable of reducing the probability of failing to detect the preamble.

To accomplish the object, the present invention detects the preamble at the output of RAKE combining that increases the signal power by gathering a plurality of peaks of the output of a matched filter.

According to the first aspect of the present invention, there is provided a CDMA mobile communications system, in which when a plurality of mobile stations access a base station using a common channel at arbitrary timings, each mobile station transmits a preamble for notifying the base station of an occurrence of a massage before actually transmitting the message, and the base station compares, in response to reception of the preamble, a received level of the preamble with a threshold value for making a decision on whether to authorize the mobile station to transmit the message or not, and transmits a transmission control signal for controlling message transmission to the mobile station in accordance with a compared result, the CDMA mobile communications system comprising: measuring means for measuring a signal-to-interference power ratio after RAKE combining when the base station receives the preamble transmitted from the mobile station; comparing means for comparing the signal-to-interference power ratio with the predetermined threshold value for deciding on whether to authorize the message transmission or not; and control means for transmitting the transmission control signal authorizing the message transmission when the comparing means decides that the measured signal-to-interference power ratio is equal to or greater than the threshold value, and for inhibiting transmission of the transmission control signal authorizing the message transmission when the comparing means decides that the measured signal-to-interference power ratio is less than the threshold value.

According to the second aspect of the present invention, there is provided a random access control method in a CDMA mobile communications system, in which when a plurality of mobile stations access a base station using a common channel at arbitrary timings, each mobile station transmits a preamble for notifying the base station of an occurrence of a massage before actually transmitting the message, and the base station compares, in response to reception of the preamble, a received level of the preamble with a threshold value for making a decision on whether to authorize the mobile station to transmit the message or not, and transmits a transmission control signal for controlling message transmission to the mobile station in accordance with a compared result, the random access control method in the CDMA mobile communications system comprising the steps of: measuring a signal-to-interference power ratio after RAKE combining when the base station receives the preamble transmitted from the mobile station; comparing the signal-to-interference power ratio with the predetermined threshold value for deciding on whether to authorize the message transmission or not; and transmitting the transmission control signal authorizing the message transmission when a decision is made as a result of the comparing that the measured signal-to-interference power ratio is equal to or greater than the threshold value, and inhibiting transmission of the transmission control signal authorizing the message transmission when a decision is made that the measured signal-to-interference power ratio is less than the threshold value.

According to the third aspect of the present invention, there is provided a base station of a CDMA mobile communications system, in which when a plurality of mobile stations access a base station using a common channel at arbitrary timings, each mobile station transmits a preamble for notifying the base station of an occurrence of a massage before actually transmitting the message, and the base station compares, in response to reception of the preamble, a received level of the preamble with a threshold value for making a decision on whether to authorize the mobile station to transmit the message or not, and transmits a transmission control signal for controlling message transmission to the mobile station in accordance with a compared result, the base station of the CDMA mobile communications system comprising: measuring means for measuring a signal-to-interference power ratio after RAKE combining when the base station receives the preamble transmitted from the mobile station; comparing means for comparing the signal-to-interference power ratio with the predetermined threshold value for deciding on whether to authorize the message transmission or not; and control means for transmitting the transmission control signal authorizing the message transmission when the comparing means decides that the measured signal-to-interference power ratio is equal to or greater than the threshold value, and for inhibiting transmission of the transmission control signal authorizing the message transmission when the comparing means decides that the measured signal-to-interference power ratio is less than the threshold value.

According to the fourth aspect of the present invention, there is provided a recording medium storing a computer readable program of a random access control method in a CDMA mobile communications system, in which when a plurality of mobile stations access a base station using a common channel at arbitrary timings, each mobile station transmits a preamble for notifying the base station of an occurrence of a massage before actually transmitting the message, and the base station compares, in response to reception of the preamble, a received level of the preamble with a threshold value for making a decision on whether to authorize the mobile station to transmit the message or not, and transmits a transmission control signal for controlling message transmission to the mobile station in accordance with a compared result, the random access control method in the CDMA mobile communications system comprising the steps of: measuring a signal-to-interference power ratio after RAKE combining when the base station receives the preamble transmitted from the mobile station; comparing the signal-to-interference power ratio with the predetermined threshold value for deciding on whether to authorize the message transmission or not; and transmitting the transmission control signal authorizing the message transmission when a decision is made as a result of the comparing that the measured signal-to-interference power ratio is equal to or greater than the threshold value, and inhibiting transmission of the transmission control signal authorizing the message transmission when a decision is made that the measured signal-to-interference power ratio is less than the threshold value.

The above and other objects, effects, features and advantages of the present invention will become more apparent from the following description of an embodiment thereof taken in conjunction with the accompanying drawings.

DETAILED DESCRIPTION OF THE PREFERRED EMBODIMENT

Figure 1:
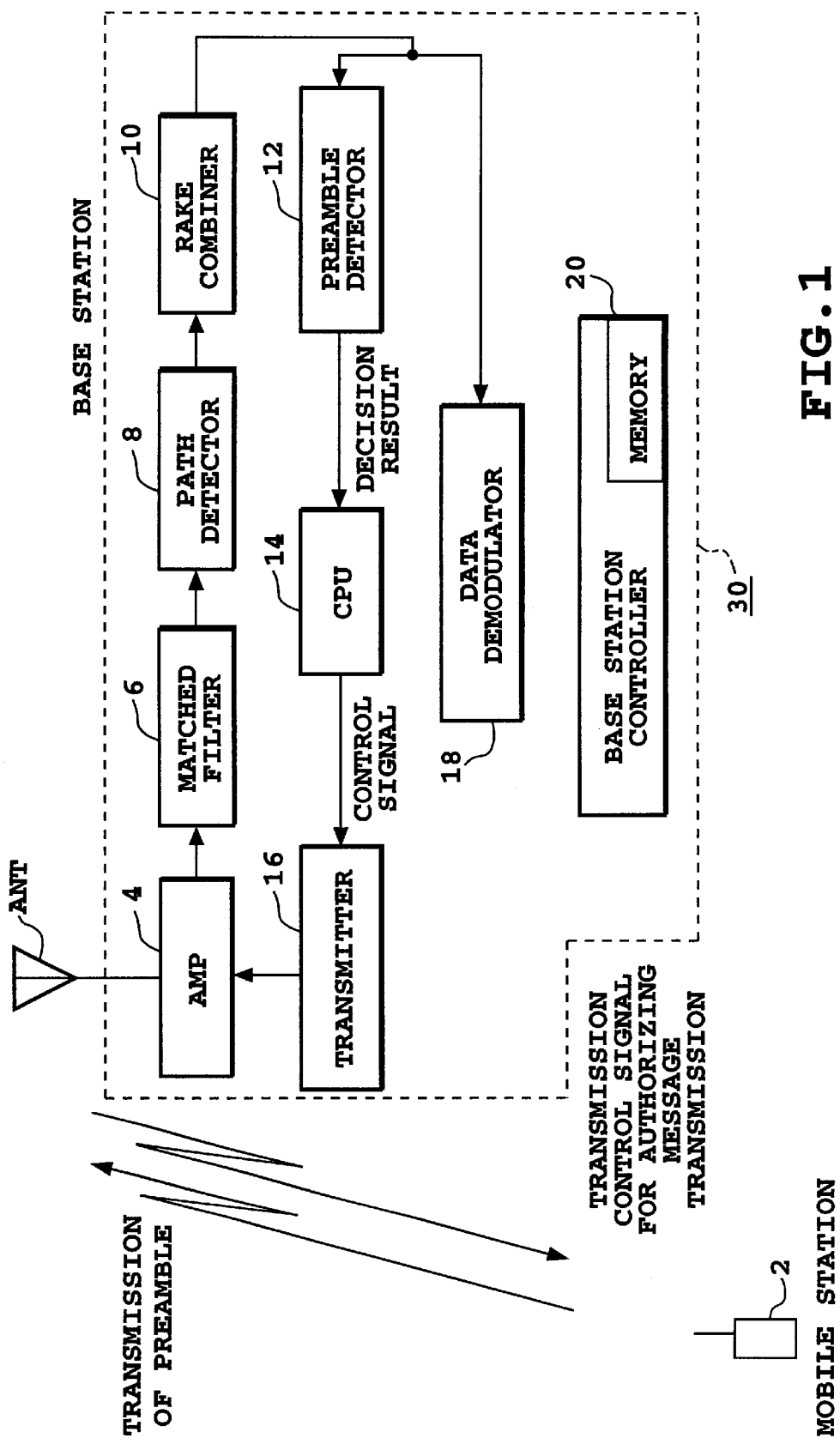
FIG. 1 is a block diagram showing an entire configuration of a CDMA mobile communications system in accordance with the present invention.

According to an embodiment in accordance with the present invention, in a random access control method in a CDMA mobile communications system, in which when a plurality of mobile stations access a base station using a common channel at arbitrary timings, each mobile station transmits a preamble for notifying the base station of an occurrence of a massage before actually transmitting the message, and the base station compares, in response to reception of the preamble, a received level of the preamble with a threshold value for making a decision on whether to authorize the mobile station to transmit the message or not, and transmits a transmission control signal for authorizing the message transmission to the mobile station in accordance with a compared result, the base station measures a signal-to-interference power ratio after RAKE combining when the base station receives the preamble transmitted from the mobile station; compares the signal-to-interference power ratio with the predetermined threshold value for deciding on whether to authorize the message transmission or not; and transmits the transmission control signal authorizing the message transmission when the compared result indicates that the measured signal-to-interference power ratio is equal to or greater than the threshold value, and inhibiting transmission of the transmission control signal authorizing the message transmission when the measured signal-to-interference power ratio is less than the threshold value.

As for the base station of the present embodiment of a CDMA mobile communications system, in which when a plurality of mobile stations access a base station using a common channel at arbitrary timings, each mobile station transmits a preamble for notifying the base station of an occurrence of a massage before actually transmitting the message, and the base station, receiving the preamble, compares the received level of the preamble with a threshold value for making a decision on whether to authorize the mobile station to transmit the message or not, and transmits a transmission control signal for controlling message transmission to the mobile station in accordance with a compared result, the base station of the CDMA mobile communications system comprising: measuring means for measuring a signal-to-interference power ratio of the preamble; comparing means for comparing the signal-to-interference power ratio measured after RAKE combining with the predetermined threshold value for deciding on whether to authorize the mobile station to transmit the message or not; and control means for transmitting the transmission control signal authorizing the message transmission when the compared result by the comparing means indicates that the measured signal-to-interference power ratio is equal to or greater than the threshold value, and for inhibiting transmission of the transmission control signal authorizing the message transmission when the measured signal-to-interference power ratio is less than the threshold value.

An embodiment according to the invention will now be described with reference to the accompanying drawings.

Figure 2:
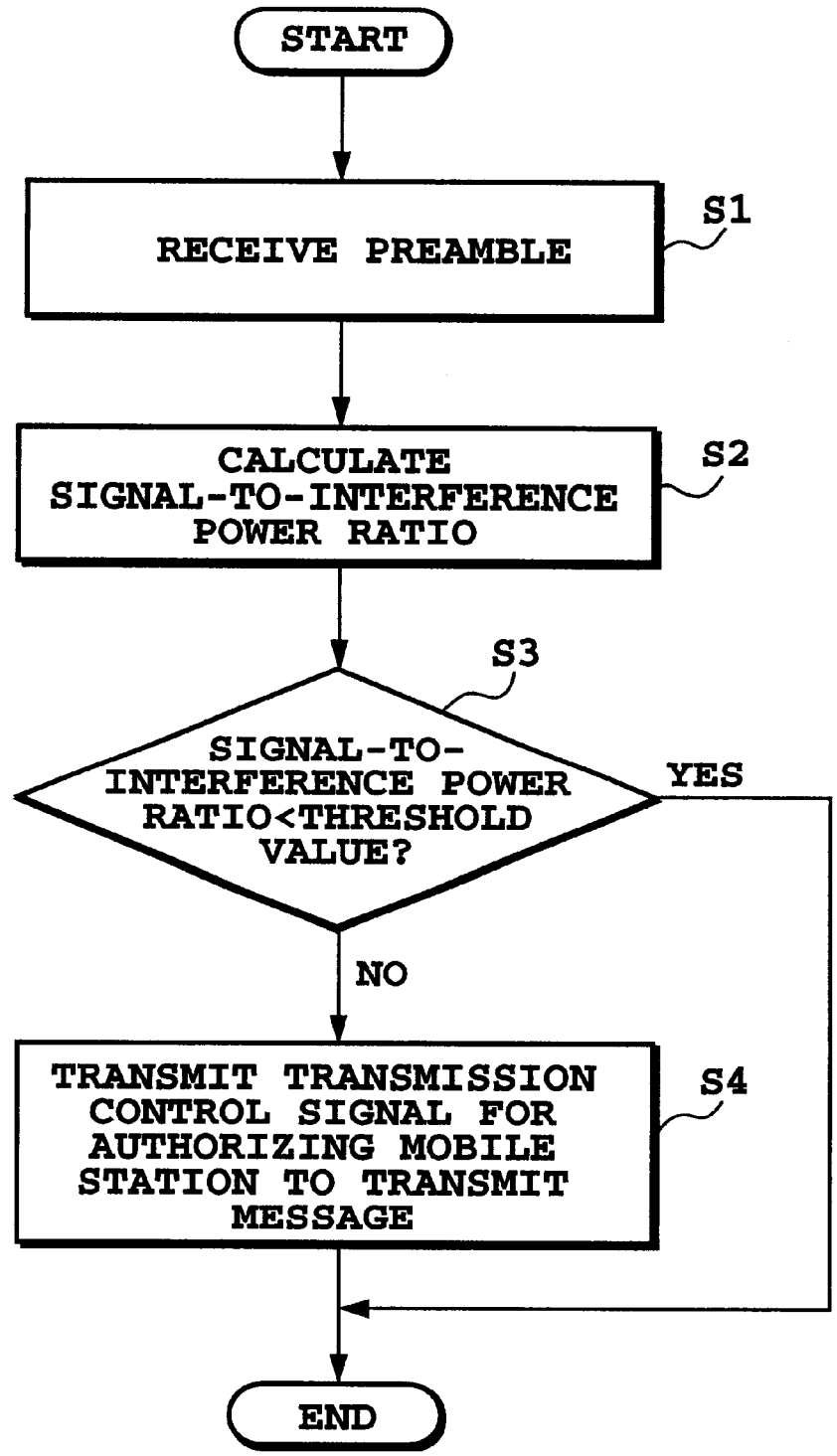
FIG. 2 is a flowchart illustrating a preamble processing procedure of a base station.

FIG. 1 is a block diagram showing an entire configuration of a CDMA mobile communications system in accordance with the present invention. In FIG. 1, the reference numeral 2 designates a mobile station. The reference symbol ANT designates an antenna of a base station, the reference numeral 4 designates an amplifying processor, 6 designates a matched filter, 8 designates a path detector, 10 designates a RAKE combiner, and 12 designates a preamble detector. The preamble detector 12 calculates the signal-to-interference power ratio after RAKE combining, and controls the message transmission by comparing the calculation result with the threshold value (this will be described later with reference to FIG. 2). The reference numeral 14 designates a CPU, 16 designates a transmitter, and 18 designates a data demodulator. The reference numeral 20 designates a base station controller for controlling the entire operation of the base station. The base station controller includes a memory for storing the processing procedure as shown in FIG. 2, which will be described below. The reference numeral 30 designates the base station in its entirety.

FIG. 2 is a flowchart illustrating the processing procedure of the base station.

Referring to FIGS. 1 and 2, the operation of the base station when it receives a preamble will be described.

The preamble detector 12 of the base station 30 measures the signal-to-interference power ratio at the output of the RAKE combining of a received preamble, and makes a decision on whether to authorize message transmission or not by comparing the detection result with the threshold value (step S1, step S2 and step S3).

The preamble detector 12 supplies its decision result to the CPU 14. When a decision has been made that the measurement value is equal to or greater than the threshold value, the CPU 14 has the transmitter 16 transmit the transmission control signal authorizing the mobile station that sent the preamble to transmits the message (step S4). In contrast, when the decision has been made that the measurement value is less than the threshold value, the CPU 14 does not authorize the mobile station to transmit the message (end of the processing).

Returning again to the flowchart of FIG. 2 illustrating the operation of the base station, the processing procedure of the random access control method in the present embodiment will be described. In FIG. 2, the base station reads out of the memory the signal-to-interference power ratio calculated from the output of the RAKE combining and the predetermine threshold value for controlling the message transmission, and compares them. When the signal-to-interference power ratio is greater than or equal to the threshold value ("No" at step S3), the base station transmits the transmission control signal that authorizes the message transmission (step S4). On the contrary, when the received level is less than the threshold value, it does not transmits the transmission control signal that authorizes the message transmission (end of the processing).

As described above, the present invention can implement a CDMA mobile communications system and its random access control method and base station capable of reducing the probability of failing to detect the preamble.

More specifically, according to the present invention, although the signal power is dispersed at the output of a matched filter, the possibility of failing to detect the preamble is reduced by using the output of the RAKE combining that collects the plurality of peaks to detect the preamble, thereby making more effective random access control possible than the conventional system can achieve.

The present invention has been described in detail with respect to a preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A CDMA mobile communication system, in which when a plurality of mobile stations access a base station using a common channel at arbitrary timings, each mobile station transmits a preamble for notifying the base station of an occurrence of a message before actually transmitting the message, and the base station compares, in response to reception of the preamble, a received level of the preamble with a predetermined threshold value for making a decision on whether to authorize the mobile station to transmit the message or not, and transmits a transmission control signal for controlling message transmission to the mobile station in accordance with a compared result, said CDMA mobile communications system comprising:

measuring means for measuring a signal-to-interference power ratio after RAKE combining when the base station receives the preamble transmitted from the mobile station;

comparing means for comparing the signal-to-interference power ratio with the predetermined threshold value for deciding on whether to authorize the message transmission or not; and control means for transmitting the transmission control signal authorizing the message transmission when said comparing means decides that the measured signal-to-interference power ratio is equal to or greater than the predetermined threshold value, and for inhibiting transmission of the transmission control signal authorizing the message transmission when said comparing means decides that the measured signal-to-interference power ratio is less than the predetermined threshold value.

2. A random access control method in a CDMA mobile communications system, in which when a plurality of mobile stations access a base station using a common channel at arbitrary timings, each mobile station transmits a preamble for notifying the base station of an occurrence of a message before actually transmitting the message, and the base station compares, in response to reception of the preamble, a received level of the preamble with a predetermined threshold value for making a decision on whether to authorize the mobile station to transmit the message or not, and transmits a transmission control signal for controlling message transmission to the mobile station in accordance with a compared result, said random access control method in the CDMA mobile communications system comprising the steps of:

measuring a signal-to-interference power ratio after RAKE combining when the base station receives the preamble transmitted from the mobile station;

comparing the signal-to-interference power ratio with the predetermined threshold value for deciding on whether to authorize the message transmission or not; and transmitting the transmission control signal authorizing the message transmission when a decision is made as a result of the comparing that the measured signal-to-interference power ratio is equal to or greater than the predetermined threshold value, and inhibiting transmission of the transmission control signal authorizing the message transmission when a decision is made that the measured signal-to-interference power ratio is less than the predetermined threshold value.

3. A base station of a CDMA mobile communications system, in which when a plurality of mobile stations access the base station using a common channel at arbitrary timings, each mobile station transmits a preamble for notifying the base station of an occurrence of a massage before actually transmitting the message, and the base station compares, in response to reception of the preamble, a received level of the preamble with a predetermined threshold value for making a decision on whether to authorize the mobile station to transmit the message or not, and transmits a transmission control signal for controlling message transmission to the mobile station in accordance with a compared result, said base station of the CDMA mobile communications system comprising:

measuring means for measuring a signal-to-interference power ratio after RAKE combining when the base station receives the preamble transmitted from the mobile station;

comparing means for comparing the signal-to-interference power ratio with the predetermined threshold value for deciding on whether to authorize the message transmission or not; and control means for transmitting the transmission control signal authorizing the message transmission when said comparing means decides that the measured signal-tointerference power ratio is equal to or greater than the predetermined threshold value, and for inhibiting transmission of the transmission control signal authorizing the message transmission when said comparing means decides that the measured signal-to-interference power ratio is less then the predetermined threshold value.

4. A storing medium that stores, in a form of a readable program, a random access control method in a CDMA mobile communications system, in which when a plurality of mobile stations access a base station using a common channel at arbitrary timings, each mobile station transmits a preamble for notifying the base station of an occurrence of a message before actually transmitting the message, and the base station compares, in response to reception of the preamble, a received level of the preamble with a predetermined threshold value for making a decision on whether to authorize the mobile station to transmit the message or not, and transmits a transmission control signal for controlling message transmission to the mobile station in accordance with a compared result, said random access control method comprising the steps of: measuring a signal-to-interference power ratio after RAKE combining when the base station receives the preamble transmitted from the mobile station; comparing the signal-to-interference power ratio with the predetermined threshold value for deciding on whether to authorize the message transmission or not; and transmitting the transmission control signal authorizing the message transmission when a decision is made as a result of the comparing that the measured signal-to-interference power ratio is equal to or greater than the predetermined threshold value, and inhibiting transmission of the transmission control signal authorizing the message transmission when a decision is made that the measured signal-to-interference power ratio is less than the predetermined threshold value.

* * * * *

UNITED STATES PATENT AND TRADEMARK OFFICE
CERTIFICATE OF CORRECTION

PATENT NO. : 6,847,624 B2
DATED : January 25, 2005
INVENTOR(S) : Minami Ishii and Takehiro Nakamura It is certified that error appears in the above-identified patent and that said Letters Patent is hereby corrected as shown below:

Column 2,
Line 21, change "+massage" to -- message --

Column 3,
Lines 13 and 57, change "massage" to -- message --

Column 4,
Line 15, change "massage" to -- message --

Column 5,
Line 18, change "predetermine" to -- predetermined --
Line 25, change "transmits" to -- transmit --

Signed and Sealed this

Twenty-sixth Day of July, 2005

JON W. DUDAS
*Director of the United States Patent and Trademark Office*